US008899368B2

(12) United States Patent
Ishii et al.

(10) Patent No.: US 8,899,368 B2
(45) Date of Patent: Dec. 2, 2014

(54) STEERING APPARATUS FOR VEHICLE (71) Applicant: Kawasaki Jukogyo Kabushiki Kaisha, Hyogo (JP)

(72) Inventors: Hiroshi Ishii, Kobe (JP); Daisuke Saeki, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/140,904

(22) Filed: Dec. 26, 2013

(65) Prior Publication Data
US 2014/0183836 A1 Jul. 3, 2014

(30) Foreign Application Priority Data

Dec. 27, 2012 (JP) ................................. 2012-285604

(51) Int. Cl.
| B62K 11/00 | (2006.01) |
| B62K 21/18 | (2006.01) |
| B62K 25/04 | (2006.01) |
| B62K 21/02 | (2006.01) |
| B62K 25/08 | (2006.01) |
| B62K 21/00 | (2006.01) |

(52) U.S. Cl.
CPC ................ B62K 21/02 (2013.01); B62K 25/08 (2013.01); B62K 21/005 (2013.01)
USPC ............................ 180/219; 280/276; 280/283

(58) Field of Classification Search
CPC ........ B62K 11/00; B62K 11/04; B62K 21/00; B62K 25/08
USPC .......... 180/219, 227; 280/275, 276, 277, 279, 280/280, 283
See application file for complete search history.

(56) References Cited

U.S. PATENT DOCUMENTS

| 4,265,329 A | * | 5/1981 | de Cortanze .................. 180/219 |
| 4,526,249 A | * | 7/1985 | Parker ........................... 180/219 |
| 4,700,799 A | * | 10/1987 | Kawano ........................ 180/219 |
| 4,712,638 A | * | 12/1987 | Kawaguchi et al. .......... 180/219 |

(Continued)

FOREIGN PATENT DOCUMENTS

| JP | 1-237279 | 9/1989 |
| JP | 4-159180 | 6/1992 |
| JP | 2011-941 | 1/2011 |

OTHER PUBLICATIONS

European Search Report (ESR) issued Feb. 7, 2014 in corresponding European Patent Application No. EP 13 19 9338.

*Primary Examiner* — Joseph M Rocca
*Assistant Examiner* — Marc A Scharich
(74) *Attorney, Agent, or Firm* — Wenderoth, Lind & Ponack, LLP (57) ABSTRACT

A steering apparatus for a two-wheeled motor vehicle includes a handlebars-side steering shaft supported by a head pipe, a wheel supporting cylindrical shaft supported by a front axle and over which a hub is fitted, and a steering link mechanism. First and second link members of the link mechanism are connected to each other in a plurality of articulations such that the link members can angularly move. An amount of angular movement is limited to a predetermined range, and a distance between a front wheel-side end and the steering shaft-side end of the steering link mechanism can be changed. The front wheel-side end of the steering link mechanism is connected to the wheel supporting cylindrical shaft through a brake caliper bracket member.

11 Claims, 7 Drawing Sheets

(56) References Cited

U.S. PATENT DOCUMENTS

| | | | |
|---|---|---|---|
| 4,721,179 A * | 1/1988 | Yamaguchi et al. | 180/219 |
| 4,723,621 A * | 2/1988 | Kawano et al. | 180/219 |
| 4,741,545 A | 5/1988 | Honma et al. | |
| 4,756,547 A | 7/1988 | Trema | |
| 4,807,898 A * | 2/1989 | Huntly | 280/276 |
| 4,813,511 A * | 3/1989 | Yamaguchi et al. | 180/219 |
| 4,821,833 A * | 4/1989 | Yamaguchi | 180/219 |
| 4,828,069 A * | 5/1989 | Hatsuyama | 180/219 |
| 5,014,808 A * | 5/1991 | Savard et al. | 180/219 |
| 5,042,608 A * | 8/1991 | Horiike et al. | 180/219 |
| 5,042,609 A * | 8/1991 | Krispler et al. | 180/219 |
| 5,050,699 A * | 9/1991 | Savard | 180/219 |
| 5,069,303 A * | 12/1991 | Fuller | 180/219 |
| 5,361,864 A * | 11/1994 | Tanaka | 180/219 |
| 5,417,305 A * | 5/1995 | Parker | 180/219 |
| 5,485,893 A * | 1/1996 | Summers | 180/219 |
| 5,503,244 A * | 4/1996 | Beirlein | 180/219 |
| 6,349,784 B1 * | 2/2002 | van der Heide | 180/219 |
| 6,880,662 B2 * | 4/2005 | Noble et al. | 180/219 |
| 7,806,217 B2 * | 10/2010 | Hasegawa et al. | 180/219 |
| 7,887,077 B2 * | 2/2011 | Thiers | 280/276 |
| 7,896,379 B2 * | 3/2011 | Nagao et al. | 280/276 |
| 2008/0179125 A1 * | 7/2008 | Glover | 180/227 |
| 2010/0044996 A1 * | 2/2010 | Marqueton | 280/276 |

* cited by examiner

STEERING APPARATUS FOR VEHICLE

BACKGROUND OF THE INVENTION

The present invention relates to a steering apparatus for a vehicle in which an axle supporting arm is vertically swingably supported by a vehicle body, the axle supporting arm extends forward from the vehicle body, and a front axle is fixed to a front end of the axle supporting arm.

Figure 8:
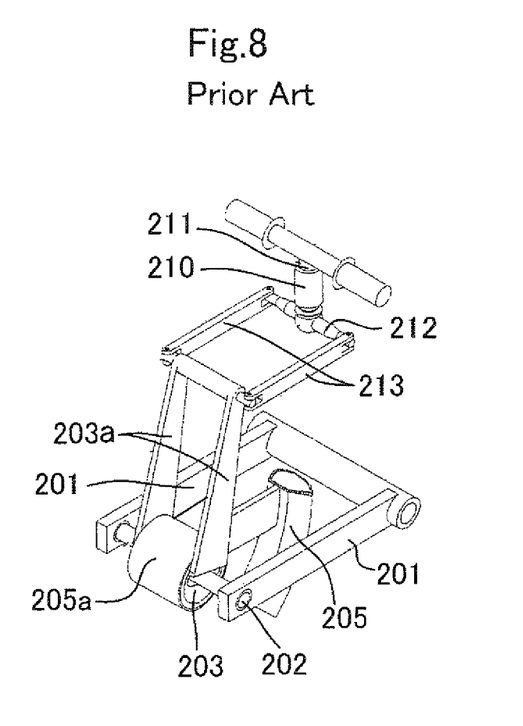
FIG. 8 is a perspective view of a conventional technique.

FIG. 8 shows a conventional two-wheeled motor vehicle, i.e. a motor cycle (JP 2011-941 A) having a front wheel supporting structure of a swing arm manner. A front axle 202 integrally provided with a kingpin (not shown) is fixed to a front end of a swing arm 201, a knuckle 203 is mounted on the kingpin such that the knuckle 203 can laterally be steered, and a hub 205a of a front wheel 205 is rotatably supported by the knuckle 203.

A pair of left and right knuckle arms 203a projecting upward is rigidly fixed to the knuckle 203. Upper ends of both the knuckle arms 203a are integrally coupled to each other. A laterally extending steering arm 212 is coupled to a lower end of a steering shaft 211 which is turnably supported by the head pipe 210. Both left and right ends of the steering arm 212 and the pair of left and right knuckle arms 203a are laterally turnably connected to each other through a pair of left and right link arms 213.

As another conventional technique, there exists a steering apparatus for a two-wheeled motor vehicle in which a pair of left and right upwardly extending fork members supports a front axle, and the fork members are connected to a steering shaft through a link mechanism (JP 2011-201335 A).

According to the conventional structure shown in FIG. 8, the knuckle arms 203a and the link arms 213 which are utilized for steering configure, together with the swing arm 201, a parallel link mechanism which vertically swingably supports the front axle 202 and the front wheel 205. Therefore, when the front wheel 205 vertically swings, since a reaction force from a road surface is shared and received, the link arms 213 and the knuckle arms 203a are required to have rigidity of a certain level or higher. Hence, a weight of the steering apparatus increases, and a great steering force is required at the time of steering. Further, a structure of the steering apparatus also becomes complicated.

In the latter conventional technique, when the vehicle laterally swings, a large front frame and large handlebars which support the front axle also laterally swing, and a great steering force is required.

SUMMARY OF THE INVENTION

The present invention has been accomplished in view of this problem, and it is an object of the invention to provide a lightweight steering apparatus for a vehicle capable of suppressing a force required for steering to a small level.

To solve the above problem, the present invention provides a steering apparatus for a vehicle comprising: an axle supporting arm vertically swingably supported by a vehicle body, the axle supporting arm extending forward from the vehicle body; a front axle fixed to a front end of the axle supporting arm; a wheel supporting cylindrical shaft laterally swingably supported by the front axle; a hub of a front wheel rotatably fitted on an outer periphery of the wheel supporting cylindrical shaft; and a bracket member formed as a member independent from the axle supporting arm, the bracket member extending radially outward of the front wheel from the wheel supporting cylindrical shaft. The steering apparatus further comprises a handlebars-side steering shaft which is laterally turnably supported by a head pipe of a vehicle body frame, and a link mechanism which connects the handlebars-side steering shaft and the bracket member to each other such that a steering force can be transmitted, the link mechanism includes a plurality of link members, the link members are connected to each other in a plurality of articulations such that the link members can angularly move around an angularly moving shaft which is parallel to a core (centerline) of the wheel supporting cylindrical shaft, and a distance between one end of the link mechanism closer to the bracket member and another end of the link mechanism closer to the steering shaft can be changed.

According to the present invention, most of a load caused when the front axle and the front wheel vertically swing is received by the front axle supporting arm, and a steering force at the time of the steering is propagated or transmitted to the wheel supporting cylindrical shaft through the link mechanism and the bracket member irrespective of the front axle supporting arm. Therefore, it is possible to suppress a force required for steering to a small level, and to reduce weights of steering force-propagating members which propagate a steering force.

Further, since the steering force-propagating members and the axle supporting arm are independently configured, flexibility of design of an axle supporting structure and a steering structure is enhanced. For example, it is possible to reduce rigidity of the steering force-propagating members and to simplify a shaft supporting structure.

According to the present invention, the steering apparatus can include the following configurations.

(a) The bracket member extends upward from the wheel supporting cylindrical shaft, and the link mechanism is disposed between the front wheel and the handlebars-side steering shaft in a vertical direction.

According to this configuration, since the bracket member is brought close to the handlebars side, it is possible to prevent the link mechanism from becoming large in size.

(b) The bracket member includes a portion which supports a brake caliper.

According to this configuration, the bracket member is utilized as a steering force-propagating member and also as a brake caliper supporting member. Therefore, it is possible to reduce the number of parts and weight of the steering apparatus.

(c) The steering apparatus for a vehicle further includes one more bracket member, each of the bracket members is provided on each of left and right sides of the wheel supporting cylindrical shaft, and the link mechanism is connected to the left and right bracket members.

According to this configuration, the wheel supporting cylindrical shaft is supported from left and right sides and steered. Therefore, as compared with a case where the link mechanism is connected to only one side of the wheel supporting cylindrical shaft, a twist in a steering force propagating path becomes small, and responsiveness of a steering force to the wheel supporting cylindrical shaft is enhanced. Further, by utilizing a spherical joint, an excessive twist of the link mechanism can be absorbed.

(d) The plurality of link members includes a first link member of a handlebar-side and second link members, the first link member has a lateral width crossing a plane which includes a core (centerline) of the handlebars-side steering shaft, and the second link members are a pair of left and right bifurcated-shaped second link members which connect the first link member and a fixing member fixed to the bracket member.

According to this configuration, a twist of the link mechanism can be prevented without increasing rigidity of the second link member.

(e) The articulation which connects the link members to each other is located to rearward of a line which connects the handlebars-side end and the bracket member-side end of the link mechanism to each other.

According to this configuration, the link mechanism does not project forward when the front wheel moves upward relative to the vehicle body frame. Therefore, it becomes easy to dispose vehicle body parts which should be disposed at front locations of the vehicle body such as a radiator, an identification plate and a headlight.

(f) A suspension mechanism is connected to the axle supporting arm, and a damper member of the suspension mechanism extends in a vehicle-width direction, and the damper member is disposed near an upper side rear portion of the handlebars-side end of the link mechanism.

According to this configuration, even if the front wheel vertically moves relative to the vehicle body, it is possible to prevent the link mechanism and the suspension mechanism from interfering with each other.

In short, according to the present invention, in a steering apparatus for a vehicle, a front wheel is supported by a shaft supporting arm of a swing arm manner, and the steering apparatus has a hub-steering mechanism on an axle. According to this steering apparatus, it is possible to suppress a force required for steering to a small level, and weights of the steering apparatus and the vehicle can be reduced.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

Figure 1:
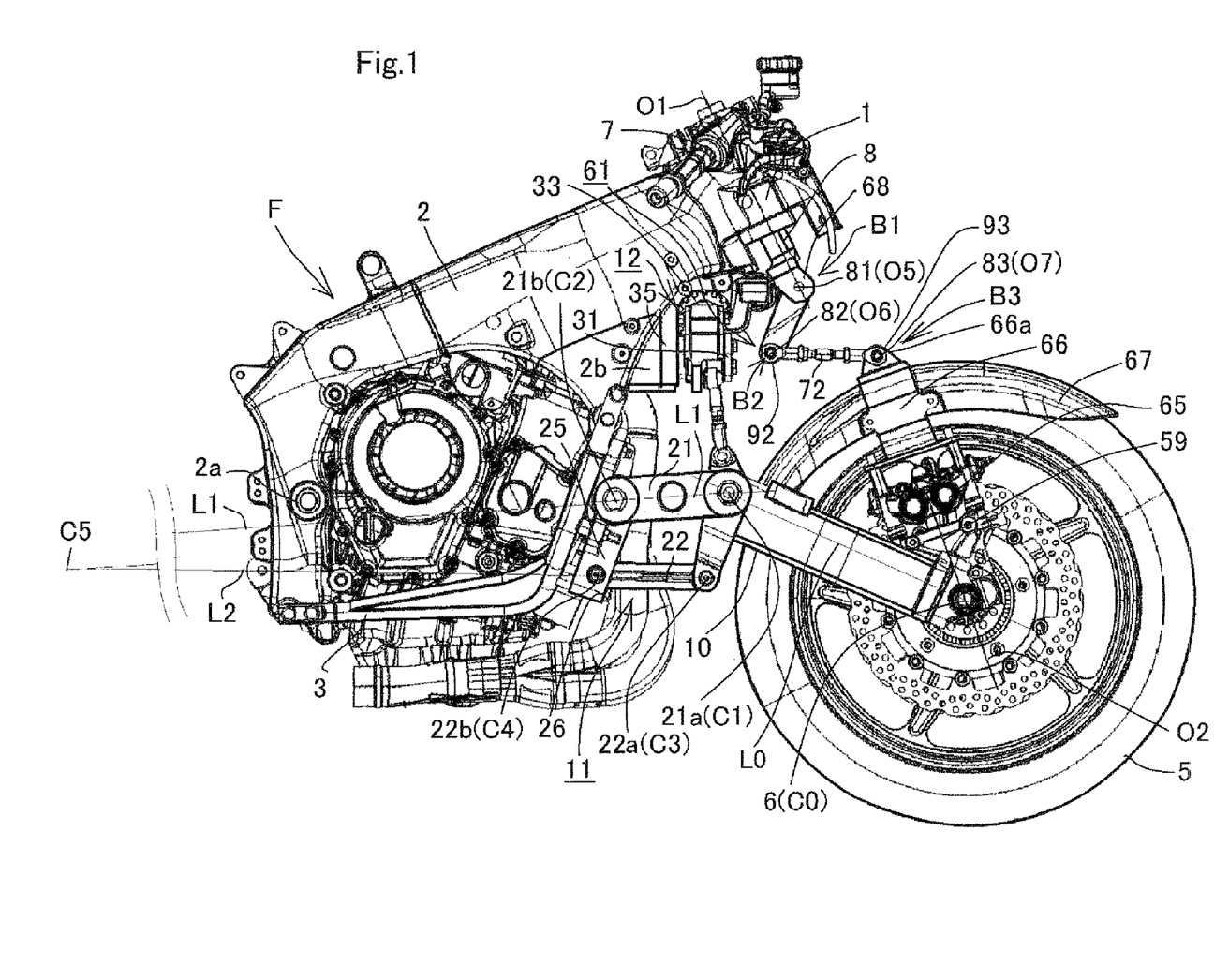
FIG. 1 is a right side view of a front half of a two-wheeled motor vehicle according to the present invention.
Figure 2:
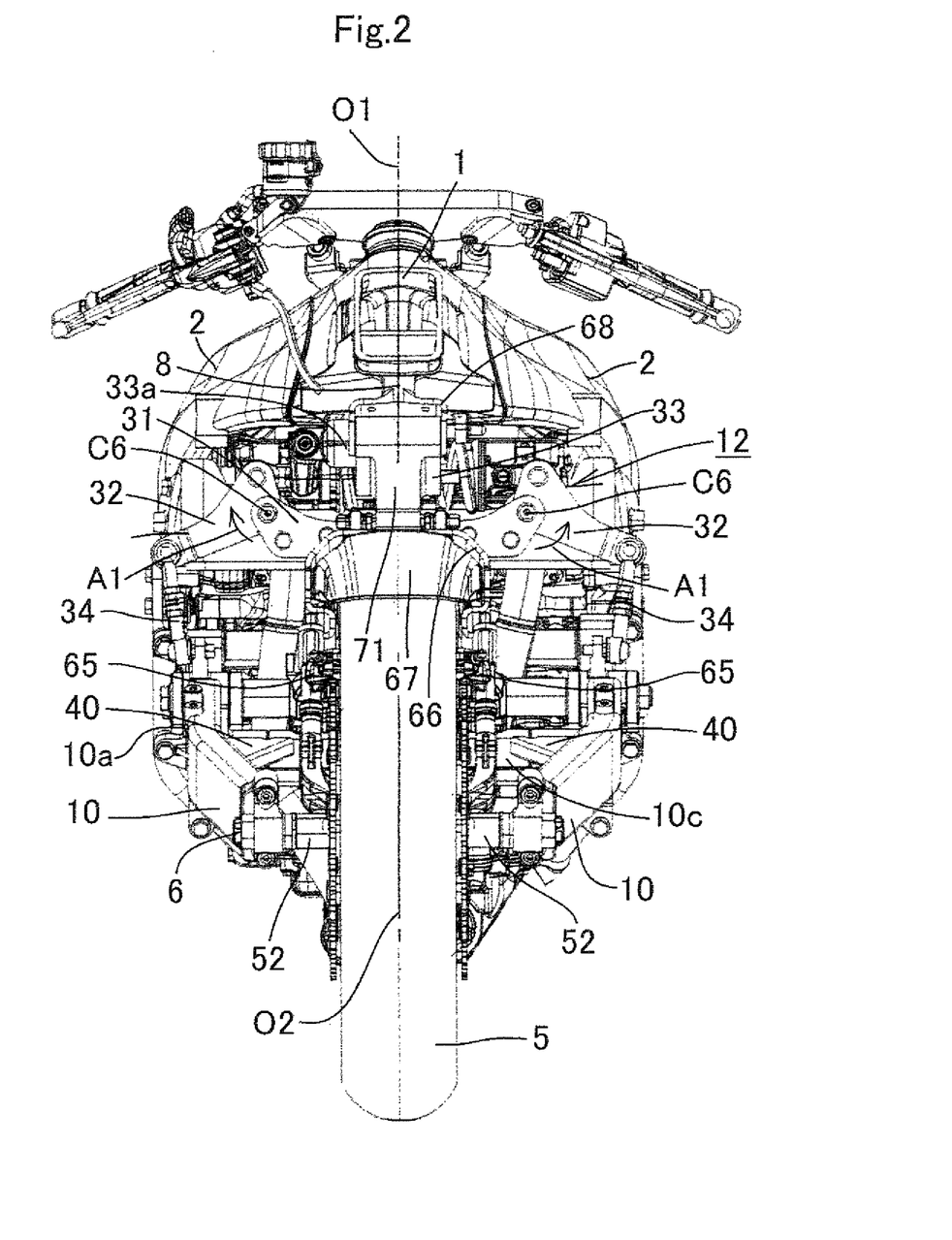
FIG. 2 is a front view of the two-wheeled motor vehicle in FIG. 1.

FIGS. 1 to 7 show a two-wheeled motor vehicle (a motorcycle) to which the present invention is applied, and an embodiment of the present invention will be described based on these drawings. FIG. 2 is a left side view of the two-wheeled motor vehicle. In FIG. 2, a vehicle body frame F includes a head pipe (head box) 1 which supports a steering shaft 8 connected with handlebars, a pair of left and right main frame members 2, and a pair of left and right down tubes 3. The head pipe 1 supports the handlebars through the steering shaft 8 such that the handlebars can angularly move. Each of the main frame members 2 is a rigid member having a rectangular vertical cross section, and the main frame member 2 is integrally formed together with the head pipe 1 by aluminum casting. The main frame member 2 straightly extends rearward and downward from the head pipe 1. A swing arm bracket 2a is integrally formed on a rear end of the main frame member 2. The swing arm bracket 2a extends downward. A mount portion 2b is formed on a lower surface of a front end of the main frame member 2 such that the mount portion 2b projects downward. The mount portion 2b has an inverted triangular shape as viewed from side of the vehicle. Each of the down tubes 3 is connected to a lower end of the mount portion 2b, and extends substantially downward. A lower end of the down tube 3 is curved rearward, and a rear end of the down tube 3 is couple to a lower end of the swing arm bracket 2a. An internal combustion engine (engine) E is mounted in a space surrounded by the main frame members 2 and the down tubes 3 as a power unit which becomes a running driving source. The internal combustion engine E is supported by the vehicle body frame F. An electric motor may be mounted instead of the internal combustion engine E. A radiator for engine coolant is mounted in front of the head pipe 1.

A front wheel supporting mechanism which supports a front wheel 5 includes a pair of left and right front arms 10 for supporting the front axle 6, parallel link mechanisms 11 composed of a pair of left and right upper link members 21 and a pair of left and right lower link members 22, and a suspension mechanism 12 for the front wheel for suppressing vertical swinging motion of the front wheel 5.

The front axle 6 is fixed to a front end of a front arm 10. The front arm 10 extends substantially rearward and upward from a front axle supporting portion. A rear end 10a of the front arm 10 is located to rearward of a rear end of the front wheel 5, and is bent downward. In this embodiment, the rear end 10a is formed independently from a main body portion of the front arm 10, and is fixed to the main body portion of the front arm 10, but it is also possible to integrally form the rear end 10a on the main body portion of the front arm 10. No matter which method is employed, in this embodiment, the front arm 10 including the rear end 10a is formed into the L-shape as viewed from side, and is formed as a rigid member.

The front arm 10 is formed such that a line L0, which connects a core (centerline or center axis) of the front axle 6 and a front fulcrum C1 between the front arm rear end 10a and an upper link member 21 to each other, inclines rearward and upward with respect to a horizontal line.

In FIG. 2, front ends of the upper link member 21 and the lower link member 22 are connected to the upper and lower ends of each of the rear ends 10a of the front arms 10 through front fulcrum pins 21a and 22a such that the front ends of the link members 21 and 22 can turn around pin axes of the front fulcrum pins 21a and 22a. The upper link member 21 and the lower link member 22 extend rearward substantially parallel to each other. A rear end of the upper link member 21 and a rear end of the lower link member 22 are connected to each of link supporting brackets 25 through rear fulcrum pins 21b and 22b such that the rear ends of the link members 21 and 22 can turn around pin axes of the rear fulcrum pins 21b and 22b. Each of the link supporting brackets 25 is detachably fixed to front surfaces of the down tubes 3 through bolts 26. The pair of left and right parallel link mechanisms 11 extends rearward substantially straightly and parallel to each other in a state where a constant distance is maintained between the link mechanisms 11 in the vehicle-width direction.

A pitch between the front and rear fulcrums C1 and C2 of the upper link member 21 and a pitch between the front and rear fulcrums C3 and C4 of the lower link member 22 are substantially equal to each other, and the upper link member 21 and the lower link member 22 are disposed substantially parallel to each other as described above. Strictly speaking, however, the lower link member 22 is disposed substantially horizontally, but the upper link member 21 is disposed such that a rear portion thereof is slightly lowered. In other word, a pitch in the vertical direction between the rear fulcrum C2 of the upper link member 21 and the rear fulcrum C4 of the lower link member 22 is slightly shorter than a pitch in the vertical direction between the front fulcrum C1 of the upper link member 21 and the front fulcrum C3 of the lower link member 22. According to this, a line L1 connecting the front and rear upper fulcrums C1 and C2 to each other and a line L2 connecting the front and rear lower fulcrums C3 and C4 to each other intersect with each other at a rear intersection point C5. Therefore, the front wheel 5 and the front axle 6 swing in the vertical direction around the intersection point C5 as a fulcrum. A position of the front axle 6 in the vertical direction is substantially the same as heights of the lower fulcrum pins 22a and 22b of the parallel link mechanism 11 in a state where no one rides on the vehicle.

A line (L0-L1) which connects a core (centerline or center axis) C0 of a front axle 6, the front fulcrum C1 of the upper link member 21 and the rear fulcrum C2 of the upper link member 21 to each other has an inverted-V shape.

In FIG. 2 showing a front view of the motorcycle, the suspension mechanism 12 includes a supporting bracket 31 which is fixed to the frame F and which has a U-shaped cross section extending along the vehicle-width direction, a pair of left and right bell crank members (connecting members) 32 which is turnably supported by vehicle-widthwise both ends of the supporting bracket 31, a damper member 33 disposed above the supporting bracket 31 along the vehicle-width direction, and a pair of left and right tie rods 34 which connects lower ends of the bell crank members 32 and upper surfaces of the rear ends 10a of the front arms 10 to each other.

In FIG. 1, a supporting bracket 31 is located substantially directly above the rear end 10a of the front arm 10 as viewed from side. A mounting stage 35 is integrally fixed to a rear surface of the supporting bracket 31. This mounting stage 35 is detachably fixed to a front end of a mount portion 2b of a vehicle body frame 2 through a bolt or the like.

The damper member 33 is a coilover unit formed by combining a coil spring and a hydraulic damper (hydraulic cylinder), and the damper member 33 is disposed substantially directly above the rear end 10a of the front arm 10 together with the supporting bracket 31.

In FIG. 2, each of left and right bell crank members 32 includes an upper arm portion projecting upward from a turning fulcrum C6, and a lower arm portion projecting obliquely downward. Upper ends of the bell crank members 32 are turnably connected to both ends of the damper member 33 in the vehicle-width direction. The damper member 33 is resiliently expanded and contracted in the vehicle-width direction (length direction of the damper member) by turning motion of both the bell crank members 32 around the fulcrum C6. A reserve tank 33a is mounted on a front side of the damper member 33.

An upper end of each of the tie rods 34 is turnably connected to a lower end of the bell crank member 32 through a ball joint (pillow ball), and a lower end of the tie rod 34 is turnably connected to an upper surface of the rear end 10a of the front arm 10 through a ball joint. Both the tie rods 34 are disposed substantially perpendicular to a horizontal plane. Lengths of the tie rods 34 can individually be adjusted by twisting structures like so-called turn buckles.

Front halves of the left and right main frame members 2 are disposed into bifurcated shape such that a distance therebetween in the vehicle-width direction gradually spreads rearward from the head pipe 1. Rear ends of the main frame members 2 are connected to each other through a plurality of cross members.

In FIG. 2, front halves of the left and right front arms 10 are disposed such that a distance therebetween in the vehicle-width direction gradually spreads rearward from the front axle supporting portion. Rear halves of the left and right front arms 10 extend rearward in a parallel state where a distance between the rear halves is maintained constant in the vehicle-width direction. The pair of left and right parallel link mechanisms 11 extends rearward substantially straightly in a parallel state where a distance therebetween is maintained constant in the vehicle-width direction.

The rear ends 10a of the left and right front arms 10 are integrally coupled to each other through a cross portion 10c, and connected portions between the cross portion 10c and the left and right front arms 10 are integrally provided with triangular reinforcing plates 40. According to this, high rigidity of the left and right front arms 10 is maintained.

Figure 6:
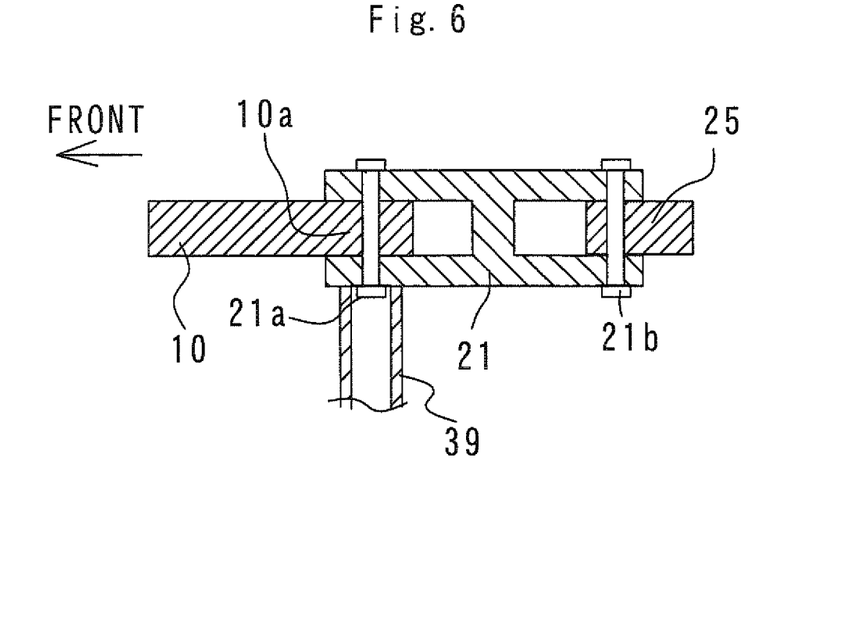
FIG. 6 is an enlarged plan view of an upper link member.

FIG. 6 is a plan view of one of the left and right upper link members 21. The upper link member 21 is formed into an H-shape as viewed from above. Bifurcated-shaped front ends of the upper link member 21 sandwich the rear end 10a of the front arm 10 from left and right sides, and are turnably coupled to each other through the upper front fulcrum pin 21a. Similarly, the bifurcated-shaped rear end of the upper link member 21 sandwiches the link supporting bracket 25 from left and right sides, and is turnably coupled to the link supporting bracket 25 through the upper rear fulcrum pin 22b.

Figure 7:
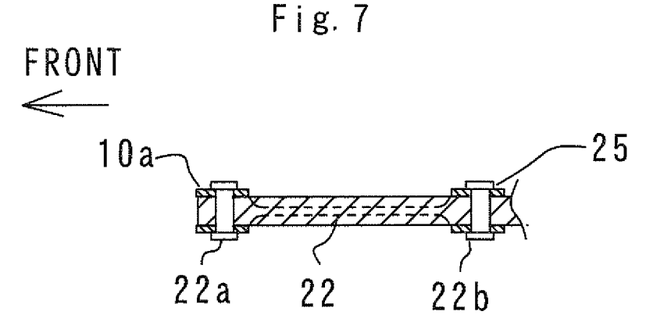
FIG. 7 is an enlarged plan view of a lower link member.

FIG. 7 is a plan view of one of the left and right lower link members 22. The lower link member 22 is formed into an I-shape as viewed from above, and a front end of the lower link member 22 is sandwiched by the bifurcated-shaped rear end 10a of the front arm 10 from left and right sides, and is turnably coupled to the rear end 10a through the lower front fulcrum pin 22a. Similarly, the rear end of the lower link member 22 is sandwiched by the bifurcated-shaped link supporting bracket 25, and is turnably coupled to the link supporting bracket 25 through the lower rear fulcrum pin 22b.

Figure 5:
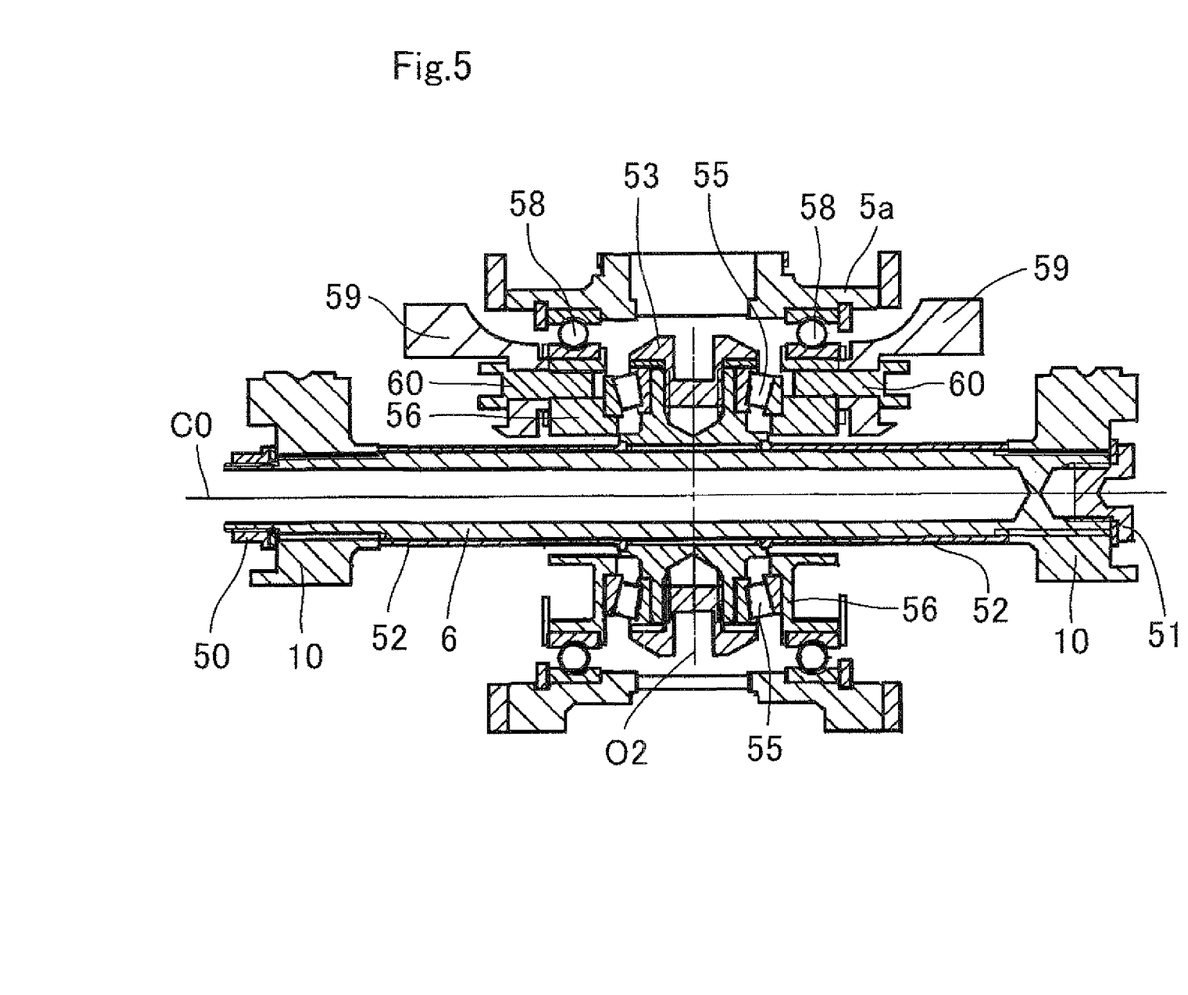
FIG. 5 is a vertical sectional view of a supporting portion of a front wheel hub.

The steering apparatus will be described. FIG. 5 is a vertical sectional view of a supporting portion of the front wheel 5. Front ends of the left and right front arms 10 are spline-fitted on left and right ends of the front axle 6, and nuts 50 and 51 are threadedly engaged. Both ends of the front axle 6 are fixed to the front arms 10 through the nuts 50 and 51.

A wheel-side steering shaft 53 is spline-fitted on an outer peripheral surface of a lateral widthwise central portion of the front axle 6. Positioning collars 52 are disposed between both left and right ends of the wheel-side steering shaft 53 and the left and right front arms 10. According to this, the wheel-side steering shaft 53 is fixed to a lateral widthwise central position of the front axle 6.

A core (centerline) O2 of the wheel-side steering shaft 53 intersects with the core (centerline or center axis) C0 of the front axle 6 at right angles. The wheel-side steering shaft 53 vertically projects with respect to the front axle 6, and is substantially disposed in parallel to a core (centerline) O1 of the handlebars-side steering shaft 8 (see FIG. 1). Inner races of a pair of upper and lower angular bearings 55 are fitted on an outer peripheral surface of the wheel-side steering shaft 53, and a wheel supporting cylindrical shaft 56 is fitted on outer races of the angular bearings 55. According to this, the wheel supporting cylindrical shaft 56 can swing around the core (centerline) O2 of the wheel-side steering shaft 53. A wheel hub 5a of the front wheel 5 is rotatably supported by the outer peripheral surfaces of the wheel supporting cylindrical shaft 56 through ball bearings 58. Further, a pair of left and right brake caliper brackets (bracket members) 59 is fixed to both left and right ends of the wheel supporting cylindrical shaft 56 through bolts 60.

Figure 4:
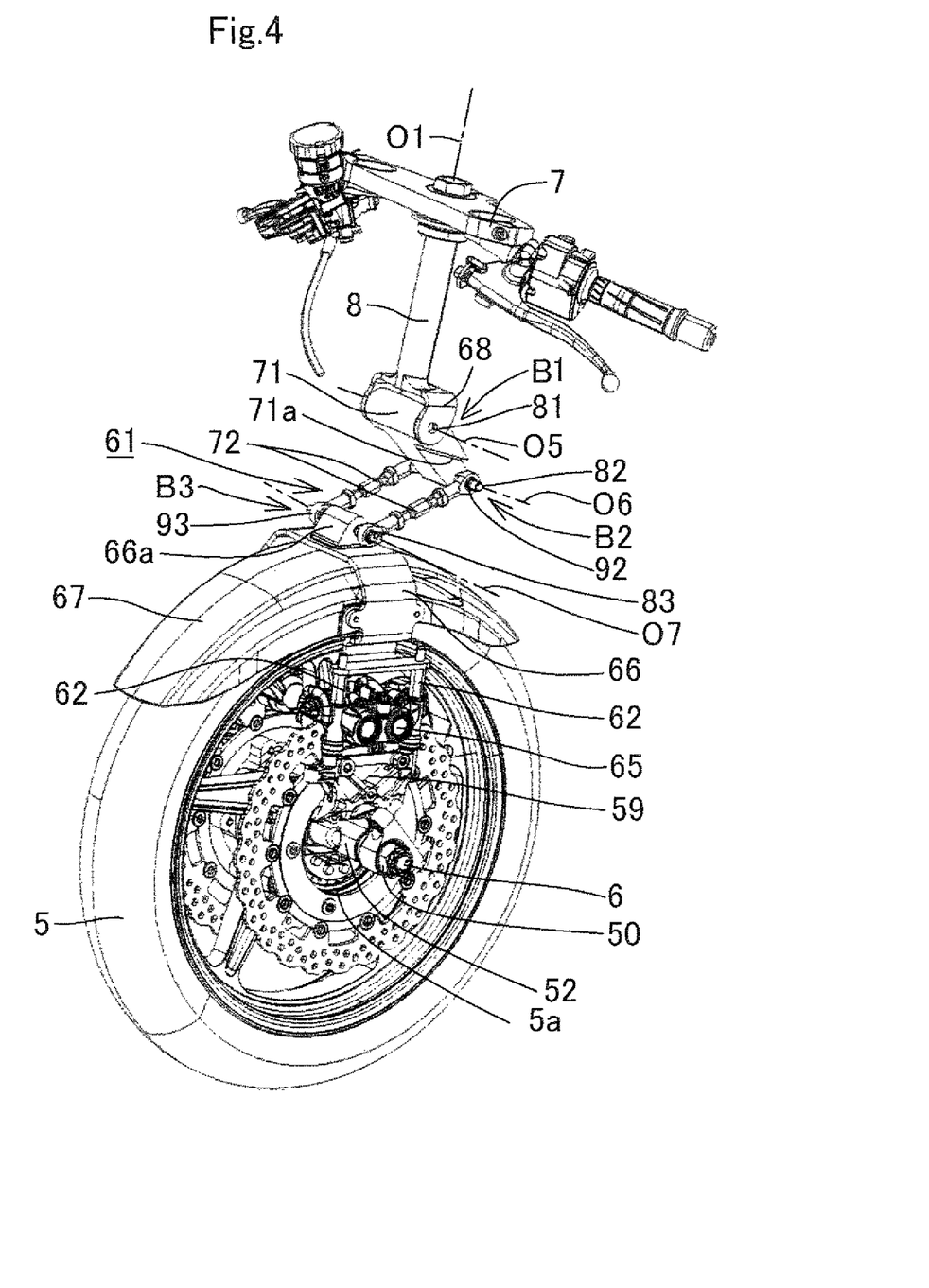
FIG. 4 is a perspective view of a steering apparatus of the two-wheeled motor vehicle in FIG. 1 as viewed from front and above.

FIG. 4 is a perspective view of the steering apparatus. In FIG. 4, a brake caliper 65 is fixed to each of the brake caliper brackets 59. A wheel-side fixing member 66 for connecting steering link mechanisms 61 is fixed to the brake caliper brackets 59 through a pair of front and rear supporting legs 62. The fixing member 66 is formed into a bifurcated shape such that it straddles a front fender 67 from above. Left and right side surfaces of the front fender 67 are fixed to an inner peripheral surface of the fixing member 66. An inverted-U shaped connecting bracket 68 is formed on a lower end of the handlebars-side steering shaft 8.

The steering link mechanism 61 is composed of a first link member 71 located on an upper side and second link members 72 located on a lower side. The first link member 71 is formed into a block shape passing through the core (centerline) O1 of the handlebars-side steering shaft 8 and having a constant width in the lateral direction. The pair of left and right second link members 72 has a screw-type turnbuckle structure, and lengths of the left and right second link members 72 can individually be adjusted.

An upper end of the first link member 71 is connected to the connecting bracket 68 of the handlebars-side steering shaft 8 through a first articulation B1, and the first link member 71 extends downward from the first articulation B1 while inclining slightly rearward.

Upper ends of the second link members 72 are connected to a lower end of the first link member 71 through a second articulation B2, and the second link members 72 extends forward and downward from the second articulation B2. Lower ends of the second link members 72 are connected to an upper end 66a of the fixing member 66 through a third articulation B3. That is, the second articulation B2 which is connected portion between the first link member 71 and the second link members 72 is located to rearward a line which connects the first articulation B1 and the third articulation B3 to each other. The first link member 71 and the second link members 72 project rearward in a state where they are bent into V-shape.

In the first articulation B1, the upper end of the first link member 71 is fitted in between left and right pieces of the connecting bracket 68, and is turnably connected to the left and right pieces through the first connecting shaft (angularly moving shaft) 81. The first connecting shaft 81 extends in the lateral direction which intersects with the core (centerline) O1 of the steering shaft 8 at right angles. That is, the first link member 71 can angularly move with respect to the steering shaft 8 in a plane, which includes the core (centerline) O1 of the handlebars-side steering shaft 8 and which intersects with a core (centerline) O5 of the first connecting shaft 81 at right angles.

In the second articulation B2, the lower end of the first link member 71 is provided with a second connecting shaft (angularly moving shaft) 82 which projects laterally from left and right side surfaces of the lower end of the first link member 71. The upper ends of the left and right second link members 72 are connected to left and right ends of the second connecting shaft 82 through ball or spherical joints 92. A core (centerline) O6 of the second connecting shaft 82 is parallel to the core (centerline) O5 of the first connecting shaft 81. That is, the first link member 71 and the second link members 72 are connected to each other such that they can angularly move in a plane which includes the core (centerline) O1 of the handlebars-side steering shaft 8 and which intersects with the core (centerline) O6 of the second connecting shaft 82 at right angles.

In the third articulation B3, an upper end 66a of the fixing member 66 is provided with a third connecting shaft (angularly moving shaft) 83 which projects laterally from left and right side surfaces of the upper end 66a of the fixing member 66. The lower ends of the left and right second link members 72 are connected to left and right ends of the third connecting shaft 83 through spherical joints 93. A core (centerline) O7 of the third connecting shaft 83 is parallel to the core (centerline) O5 of the first connecting shaft 81. That is, the second link members 72 and the fixing member 66 are connected to each other such that they can angularly move in a plane which includes the core (centerline) O1 of the handlebars-side steering shaft 8 and which intersects with the core (centerline) O7 of the third connecting shaft 83 at right angles.

It is preferable that the core (centerline) O7 of the third connecting shaft 83 is disposed between the core (centerline or center axis) C0 of the front axle 6 and the core (centerline) O5 of the first connecting shaft 81 in the longitudinal direction and the vertical direction. That is, as shown in FIG. 1, it is preferable that the brake caliper bracket 59 and the fixing member 66 extend upward and rearward from the front axle 6, and the core (centerline) O7 of the third connecting shaft 83 is disposed above and behind the front axle 6. According to this, the link mechanism 61 can be brought close to the handlebars-side steering shaft 8, and the link mechanism 61 can be made small.

Since the front and rear ends of the second link members 72 are connected to mate members through the ball joints 92 and 93. Therefore, this configuration permits slight lateral deflection and twist with respect to a plane which includes the core (centerline) O1 of the handlebars-side steering shaft 8 and which intersects with the second and third connecting shafts 82 and 83 at right angles.

Notches 71a are formed in lower halves of left and right side surfaces of the first link member 71. A lateral width of the lower half of the first link member 71 is narrower than that of an upper half of the first link member 71. According to this, when the second link members 72 swing such that they approach the first link member 71 around the core (centerline) O6 of the second articulation B2, moving regions of the second link members 72 are secured.

An operation will be described. In FIG. 4, when the vehicle turns right, if the handlebars 7 are turned right around the core (centerline) O1 of the handlebars-side steering shaft 8, a steering force is propagated to a wheel supporting cylindrical shaft 56 shown in FIG. 5 through the handlebars-side steering shaft 8, the first link member 71, the second link members 72, the fixing member 66 and the brake caliper bracket 59. According to this, the front wheel 5 swings right around the core (centerline) O2 of the wheel-side steering shaft 53 together with the wheel supporting cylindrical shaft 56.

When the vehicle turns left also, a steering force is propagated to the wheel supporting cylindrical shaft 56 shown in FIG. 5 through the handlebars-side steering shaft 8, the first link member 71, the second link members 72, the fixing member 66 and the brake caliper bracket 59.

In FIG. 1, when the vehicle runs on a bumpy road surface, the front wheel 5, the front axle 6 and the front arm 10 vertically swing together with vertical swinging motion of the front end of the parallel link mechanism 11. At this time, the steering link mechanism 61 angularly moves around the cores (centerlines) O5, O6 and O7 of the connecting shafts 81, 82 and 83 in the articulations B1, B2 and B3, and the steering link mechanism 61 absorbs vertical swinging motion of the front wheel 5. Especially when the front wheel 5 moves relatively upward toward the head pipe 1, the second articulation B2 moves rearward.

Since it is possible to individually adjust the lengths of the left and right second link members 72, it is possible to adjust swinging angles in the lateral direction of the front wheel 5 relative the handlebars-side steering shaft 8.

Vertical swinging motion of the front wheel 5 during running is propagated to from the rear ends 10a of the left and right front arms 10 to the left and right bell crank members 32 through the left and right tie rods 34. The bell crank members 32 turn upward in a direction of an arrow A1 around the fulcrum C6. According to this, the damper member 33 is compressed in the vehicle-width direction to buffer vertical swinging motion of the front wheel 5.

Effects of the Embodiments (1) Most of a load generated at the time of vertical swing of the front axle 6 and the front wheel 5 is received by the front arm (front axle supporting arm) 10. A steering force generated at the time of steering is propagated to the wheel supporting cylindrical shaft 56 through the link mechanism 61 and the bracket 59 irrespective of the front arm 10. Therefore, it is possible to suppress a force required for steering to a small level, and to reduce weights of steering force-propagating member, i.e., a weight of the link mechanism 61.

(2) The steering link mechanism 61 which is a steering force-propagating member, the fixing member 66, the bracket 59 and the front arms 10 are configured independently. Therefore, flexibility of design of the axle supporting structure and the steering structure is enhanced. For example, it is possible to reduce rigidity of steering force-propagating parts (link members 71 and 72), and to simplify a shaft supporting structure.

(3) In FIG. 4, the existing brake caliper bracket 59 is utilized as a connecting member which connects the wheel supporting cylindrical shaft 56 and the end of the steering link mechanism 61 on the side of the brake caliper bracket 59. Therefore, it is possible to simplify the structure of the steering apparatus, and to reduce the number of parts and the weight of the steering apparatus.

(4) In FIG. 1, the suspension mechanism 12 is connected to the front arm 10 and is not connected to the steering link mechanism 61 or the brake caliper bracket 59. Therefore, it is unnecessary that rigidity of the steering link mechanism 61 and the brake caliper bracket 59 is increased, and weights thereof can be reduced.

(5) In FIG. 5, the brake caliper bracket 59 is provided on each of the left and right sides of the wheel supporting cylindrical shaft 56. As shown in FIG. 4, the steering link mechanisms 61 are connected to the left and right brake caliper brackets 59 through the bifurcated-shaped fixing member 66. Therefore, twist in the propagating path of a steering force becomes small as compared with a case where the steering link mechanism is connected to only one side of the wheel supporting cylindrical shaft, and responsiveness of a steering force to the wheel supporting cylindrical shaft 56 is enhanced.

(6) In FIG. 4, the steering link mechanism 61 has a bifurcated structure having the pair of left and right second link members 72, and the bifurcated left and right second link members 72 are connected to the connection mate members through the ball joints 92 and 93. Therefore, an excessive twist of the steering link mechanism 61 can be absorbed.

(7) The steering link mechanism 61 includes the handlebars-side first link member 71 and the second link members 72 which connect the first link member 71 and the brake caliper brackets 59 to each other. Therefore, it is possible to prevent the link mechanism from twisting without increasing rigidity of the second link members 72.

(8) The steering link mechanism 61 has such a shape that the second articulation B2 is located to rearward of a line which connects the handlebars-side first articulation B1 and the front wheel-side third articulation B3 to each other. Therefore, when the front wheel 5 moves upward relative to the head pipe 1, the steering link mechanism 61 does not project forward. Hence, it becomes easy to dispose vehicle body parts such as a radiator, an identification plate and a headlight which should be disposed at front locations of the vehicle body.

(9) Since the third connecting shaft 83 is disposed on an upper surface side of the fixing member 66 and on an inner side of the fixing member 66 in the vehicle-width direction, it is possible to prevent the third connecting shaft 83 from projecting from the fender 67, and a space can be saved. Even when the vehicle turns over, it is possible to prevent the link mechanism 61 from colliding against an obstacle such as a road surface.

(10) Since the front fender 67 is fixed to the fixing member 66, a member for fixing the front fender 67 is not separately required, and it is possible to reduce the number of parts.

(11) Since the brake caliper 65 does not support the front axle 6, it is not especially necessary to increase the rigidity, and the brake caliper 65 can also be used as a steering force-propagating part.

(12) The front axle 6 is supported by the front arm 10, and the first connecting shaft 81 and the third connecting shaft 83 are linked to each other in the steering force-propagating path such that a distance therebetween can be changed. Therefore, when the front axle 6 receives a force in the vertical direction from a road surface due to its bumpy surface, the vertical force is not propagated to the handlebars-side steering shaft 8, and it is possible to prevent bump steer and the like. Especially, it is preferable that the first connecting shaft 81 and the third connecting shaft 83 are deviated from each other in the longitudinal direction. According to this, even if the front wheel 5 swings upward, it is possible to prevent the first connecting shaft 81 and the third connecting shaft 83 from interfering with each other. Since the steering link mechanism 61 is disposed in front of the damper member 33, it is possible to prevent the damper member 33 and the link mechanism 61 from interfering with each other.

(13) In FIG. 1, since the steering link mechanism 61 is disposed at a position higher than the front wheel 5, it is possible to prevent a pebble from colliding against the link mechanism 61 or from being caught in the link mechanism 61. Even if the vehicle turns over during the steering operation of the handlebars 7, the front arm 10 is prone to come into contact with a road surface first, and it is possible to prevent the link members 71 and 72 from colliding against the road surface.

(14) The third connecting shaft 83 is set in front of and above the front wheel-supporting link mechanism 11 which is connected to the rear end of the front arm 10. In other words, since the link mechanism 61 provided for supporting the front axle is disposed behind and below the third connecting shaft 83, it is possible to prevent the bell crank member 32 of the suspension mechanism 12 and the steering link mechanism 61 from interfering with each other.

(15) Since the ball joints 92 of the rear ends of the left and right second link members 72 are disposed in front of the damper member 33, it is possible to prevent the damper member 33 and the steering link mechanism 61 from interfering with each other.

(16) Since one of the two steering link members 71 and 72 (e.g., first link member 71) is formed in the block shape, it is possible to suppress a case where that link member is deformed by the link mechanism 61, and it is possible to enhance the steering feeling.

(17) Since the steering link members 71 and 72 are disposed at locations high than the front arm 10 and extend downward from the handlebars-side steering shaft 8, the steering link mechanism 61 can be reduced in size as compared with a case a steering power propagating mechanism is disposed along the front arm. Since a brake pipe is disposed along the steering link mechanism 61 from locations close to the handlebars 7, it becomes easy to shorten a pipe distance.

(18) In FIG. 2, when the brake is applied, a tire of the front wheel 5 receives a resistance force (reaction force) acting from a road surface rearward of the vehicle body. This resistance force is divided into the component force to compress the front arm 10 in the direction of the axis and a substantially vertical component force to move the front arm 10 downward. In this embodiment, since the front arm 10 extends substantially in the longitudinal direction (front-rear direction), most of the resistance force from the road surface becomes a component force acting rearward toward the axis L0 of the front arm 10 and eventually, when the brake is applied, a force acting rearward from front is applied to the vehicle body frame F. Therefore, as compared with the conventional front fork structure in which most of a resistance force from a road surface is applied in the vertical direction when the brake is applied, it is possible to reduce rigidity of the vehicle body frame F which eventually supports the front arm 10, and a weight of the vehicle body frame F can be reduced.

Figure 3:
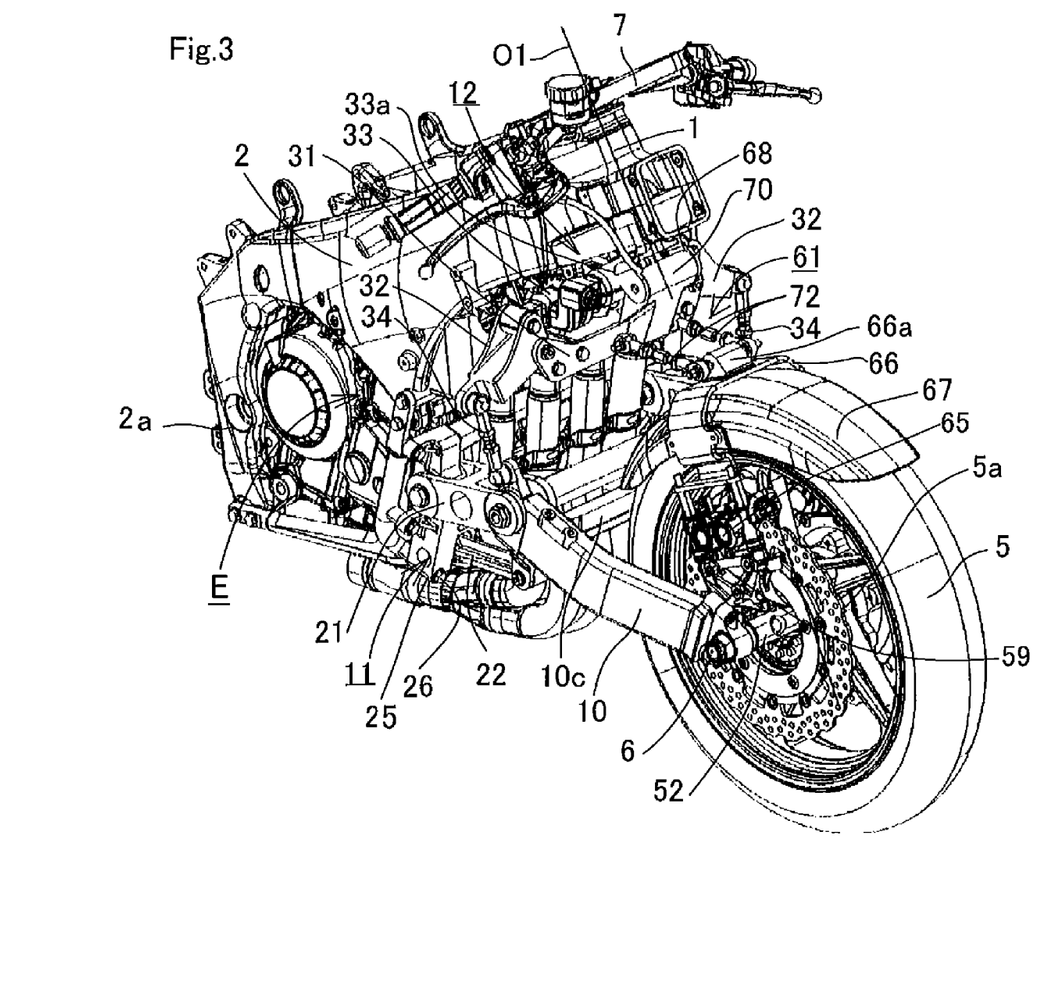
FIG. 3 is a perspective view of the two-wheeled motor vehicle in FIG. 1 as viewed from front and above.

(19) In FIG. 3, the damper member 33 of the suspension mechanism 12 extends in the vehicle-width direction, and the damper member 33 is disposed near an upper rear portion of the handlebars-side end of the front arm link mechanism 11. Therefore, even if the front wheel 5 vertically moves relative to the vehicle body frame F, it is possible to prevent the steering link mechanism 61 and the suspension mechanism 12 from interfering with each other.

(20) In FIG. 1, the front arm 10 which supports the front axle 6 extends rearward, and the rear end 10a of the front arm 10 is vertically swingably supported by the vehicle body frame F through the parallel link mechanism 11. Therefore, when the brake is applied, most of a reaction force from a road surface is received by a compression load in a length direction (substantially longitudinal direction) of the front arm instead of being received by a bending load, and the most of the reaction force is propagated to the vehicle body frame F which is located rearward. According to this, it is possible to reduce a front dive phenomenon which may be caused when the brake is applied.

(21) When the brake is applied, since the front arm 10 receives a reaction force from a road surface by the compression load in the length direction (substantially longitudinal direction) of the front arm, it is possible to enhance durability of the front arm 10 and the parallel link mechanism 12 without increasing a weight.

(22) A line L0 which connects the front axle 6 and a turning connecting point (C1) between the front arm 10 and the upper link member 21 to each other inclines rearward and upward with respect to the horizontal line. Therefore, most of energy generated at the time of collision can be absorbed by the front suspension mechanism 12.

(23) Since the rear end 10a of the front arm 10 which is connected to the link members 21 and 22 is located to rearward of the rear end of the front wheel 5, the parallel link members 21 and 22 can be shortened, and moment of the parallel link mechanism 11 can be made small. Therefore, entire supporting rigidity for supporting the front wheel is enhanced.

(24) A line (L0-L1) which connects the turning connecting point (C1) between the front axle 6, the front arm 10 and the upper link member 21, and a turning connecting point (C2) between the upper link member 21 and the link bracket 25 of the vehicle body frame F to each other is formed into an L-shape which projects upward. Therefore, like the above-described configuration (5), most of energy generated at the time of collision can be efficiently absorbed by the front suspension mechanism.

(25) Since the lower link member 22 is disposed on a more inner side in the vehicle-width direction than the upper link member 21, it is possible to reduce left and right projecting degrees of the lower link member 22, and to secure a large bank angle.

(26) The front suspension mechanism 12 includes the damper member 33 which is disposed such that it can expand and contract in the vehicle-width direction, the bell crank member 32 which converts vertical motion of the rear end 10a of the front arm 10 into motion in the vehicle-width direction and which propagates the converted motion to the damper member 33. Therefore, the damper member 33 which becomes long in the expansion and contraction direction can be disposed compactly as viewed from the side of the vehicle.

(27) The two front arms 10 and the two pairs of link members 21 and 22 are disposed on both the left and right sides of the front wheel 5. Therefore, rigidity for supporting the front axle is enhanced, and it is possible to uniformly receive, from left and right sides, a resistance force applied from a rear surface to the front wheel 5 at the time of braking, and to prevent lateral deflection of the vehicle body.

(28) The front suspension mechanism 12 suppresses the turning motion of the front arm 10. Therefore, as compared with a structure in which turning motion of the link member is suppressed, it is possible to reduce a force in a bending direction applied to the link members 21 and 22, and it is possible to lower the rigidity of the link members 21 and 22 and to reduce their weights.

(29) Positions where the front arm 10 and the link members 21 and 22 are connected to each other are located to rearward of the rear end of the front wheel 5. Therefore, it is possible to rearwardly deviate a position of the front suspension mechanism 12 for suppressing the turning motion of the front arm 10 as much as possible, and it is possible to move a barycenter toward the centralization. Positions where the front arm 10 and the link members 21 and 22 are connected to each other are located to rearward of the rear end of the front wheel 5. Therefore, for steering the front wheel, it is unnecessary to form the link members 21 and 22 into curved shapes, and the shapes of the plurality of link members 21 and 22 can be simplified into straight shapes.

(30) Most of a resistance force from a road surface acts toward the axis L0 of the front arm 10. Therefore, to prevent the front dive in which a front portion of a vehicle body sinks down, it is unnecessary to increase the spring force and the damper force of the front suspension mechanism 12. That is, influence of the front dive is small, and it is possible to set the spring force and the damper force especially to enhance ride quality.

(31) Since the front suspension mechanism 12 resiliently supports the rear end of the front arm 10, loads applied to the link members 21 and 22 are reduced, rigidity of the link members 21 and 22 is suppressed, and the vehicle can be made lighter in weight. That is, by resiliently supporting the rear end of the front arm 10, it is possible to bring the main body of the front suspension mechanism 12 close to a center of the vehicle body, or it is possible to reduce, in size, a buffer mechanism which is disposed on a location extending from the main body of the front suspension mechanism 12 to the front arm 10, and the front wheel supporting structure can be simplified.

(32) As compared with the front fork type, it is unnecessary for the head pipe 1 to support the front wheel 5. Therefore, it is unnecessary that the head pipe 1 withstands a reaction force from a road surface, rigidity of the head pipe 1 can be low, and the weight of the vehicle body frame F can be reduced.

(33) The line L1 which connects the front and rear fulcrums C1 and C2 of the link member 21 to the upper side of the parallel link mechanism 11, and the line L2 which connects the front and rear fulcrums C3 and C4 of the lower link member 22 to each other intersect with each other at the rear intersection point C5, and the front wheel 5 vertically swings around this intersection point C5, but since the intersection point C5 is located above a road surface, it becomes easy to suppress the front dive phenomenon which is caused when the brake is applied.

(34) Since the core (centerline) O1 of the handlebars-side steering shaft 8 and the core (centerline) O2 of the wheel-side steering shaft 53 are set differently from each other, flexibility of design of the steering system is enhanced.

Other Embodiments (1) The present invention may also be applied to a structure in which the steering link member is disposed on only one of the left and right sides.

(2) The second articulation B2 at which the first link member 71 and the second link members 72 are connected to each other may be located in front of a line which connects the first articulation B1 and the third articulation B3 to each other.

(3) The present invention may also be applied to a two-wheeled motor vehicle in which the front arm 10 is supported by the vehicle body without through the parallel link mechanism 11.

(4) The present invention is not limited to the two-wheeled motor vehicle (motor cycle), and the invention can also be applied to a three-wheeled vehicle and a riding-type four-wheeled vehicle.

(5) It is also possible to set the core (centerline) O2 of the wheel-side steering shaft 53 substantially vertically.

(6) The present invention can also be applied to a structure in which the suspension mechanism 12 is connected to any one of upper and lower link members 21 and 22 instead of the front arm (shaft supporting arm).

(7) Although the number of articulations of the steering link mechanism 61 is three in the embodiment, the number is not limited to three, and the steering link mechanism 61 can have four or more articulations.

(8) Although the brake caliper bracket is also used as a portion of the steering structure in the embodiment, the present invention is not limited to such a structure, and the steering structure may be provided independently from the brake caliper bracket.

The invention claimed is:

1. A steering apparatus for a vehicle comprising:
a handlebar;
an axle supporting arm vertically swingably supported by a vehicle body, the axle supporting arm extending forward from the vehicle body;
a front axle fixed to a front end of the axle supporting arm;
a wheel supporting cylindrical shaft laterally swingably supported by the front axle;
a hub of a front wheel rotatably fitted on an outer periphery of the wheel supporting cylindrical shaft;
a bracket member independent from the axle supporting arm, the bracket member extending radially outward of the front wheel from the wheel supporting cylindrical shaft;
a steering shaft which is laterally turnably supported by a head pipe of a vehicle body frame; and
a link mechanism which connects the steering shaft and the bracket member to each other such that a steering force can be transmitted from the handlebar to the front wheel, wherein
the link mechanism includes a plurality of link members, the link members are connected to each other in a plurality of articulations such that the link members can angularly move around an angularly moving shaft which is parallel to a centerline of the wheel supporting cylindrical shaft, and
the bracket member includes a portion which supports a brake caliper.

2. The steering apparatus for the vehicle according to claim 1, wherein:
the bracket member extends upward from the wheel supporting cylindrical shaft, and
the link mechanism is disposed between the front wheel and the steering shaft in a vertical direction.

3. The steering apparatus for the vehicle according to claim 1, wherein:
the bracket member is a first bracket member, and the steering apparatus further comprises a second bracket member,
the first bracket member is provided on a left side of the wheel supporting cylindrical shaft,
the second bracket member is provided on a right side of the wheel supporting cylindrical shaft, and
the link mechanism is connected to the first bracket member and the second bracket member.

4. The steering apparatus for the vehicle according to claim 1, wherein
the plurality of link members includes a first link member and second link members,
the first link member has a lateral width crossing a plane which includes a centerline of the steering shaft, and
the second link members are a pair of respective left and right bifurcated-shaped spaced-apart second link members which connect the first link member and a fixing member fixed to the bracket member.

5. The steering apparatus for the vehicle according to claim 3, wherein the plurality of articulations which connects the link members to each other are located rearward of the centerline of the wheel supporting cylindrical shaft.

6. A steering apparatus for a vehicle comprising:
handlebars;
an axle supporting arm vertically swingably supported by a vehicle body, the axle supporting arm extending forward from the vehicle body;
a front axle fixed to a front end of the axle supporting arm;
a wheel supporting cylindrical shaft laterally swingably supported by the front axle;
a hub of a front wheel rotatably fitted on an outer periphery of the wheel supporting cylindrical shaft;
a bracket member independent from the axle supporting arm, the bracket member extending radially outward of the front wheel from the wheel supporting cylindrical shaft;
a steering shaft which is laterally turnably supported by a head pipe of a vehicle body frame; and a link mechanism which connects the steering shaft and the bracket member to each other such that a steering force can be transmitted from the handlebars to the front wheel, wherein the link mechanism includes a plurality of link members, the link members are connected to each other in a plurality of articulations such that the link members can angularly move around an angularly moving shaft which is parallel to a centerline of the wheel supporting cylindrical shaft, a suspension mechanism is connected to the axle supporting arm, and a damper member of the suspension mechanism extends in a vehicle-width direction, and the damper member is disposed above a rear end of the axle supporting arm and rearward of an upper end of the link mechanism.

7. A steering apparatus for a vehicle comprising:

a handlebar;

an axle supporting arm vertically swingably supported by a vehicle body, the axle supporting arm extending forward from the vehicle body;

a front axle fixed to a front end of the axle supporting arm;

a wheel supporting cylindrical shaft laterally swingably supported by the front axle;

a hub of a front wheel rotatably fitted on an outer periphery of the wheel supporting cylindrical shaft;

a bracket member independent from the axle supporting arm, the bracket member extending radially outward of the front wheel from the wheel supporting cylindrical shaft;

a steering shaft which is laterally turnably supported by a head pipe of a vehicle body frame; and a link mechanism which connects the steering shaft and the bracket member to each other such that a steering force can be transmitted from the handlebar to the front wheel, wherein the link mechanism includes a plurality of link members, the link members are connected to each other in a plurality of articulations such that the link members can angularly move around an angularly moving shaft which is parallel to a centerline of the wheel supporting cylindrical shaft, and the link members include a first link member, a right second link member and a left second link member, a first end of the right second link member is connected to the first link member through a ball joint, a first end of the left second member is connected to the first link member through a ball joint, a second end of the right second link member is connected to the bracket member through a ball joint and a fixing member, and a second end of the left second member is connected to the bracket member through a ball joint and the fixing member.

8. The steering apparatus for the vehicle according to claim 7, wherein a front fender is fixed to the bracket member through the fixing member.

9. The steering apparatus for the vehicle according to claim 8, wherein the second end of the right second link member and the second end of the left second link member are supported by a connecting shaft, and a width of the connecting shaft is less than a width of the front fender in a vehicle-width direction.

10. The steering apparatus for the vehicle according to claim 7, wherein a length of the right second link member and a length of the left second link member are individually adjustable.

11. The steering apparatus for the vehicle according to claim 7, wherein a centerline of the front axle and a centerline of the wheel supporting cylindrical shaft intersect one another.

* * * * *